Sept. 9, 1958     R. C. WOODWARD     2,851,085
COLLAPSIBLE SEAT
Filed June 7, 1955     2 Sheets-Sheet 1
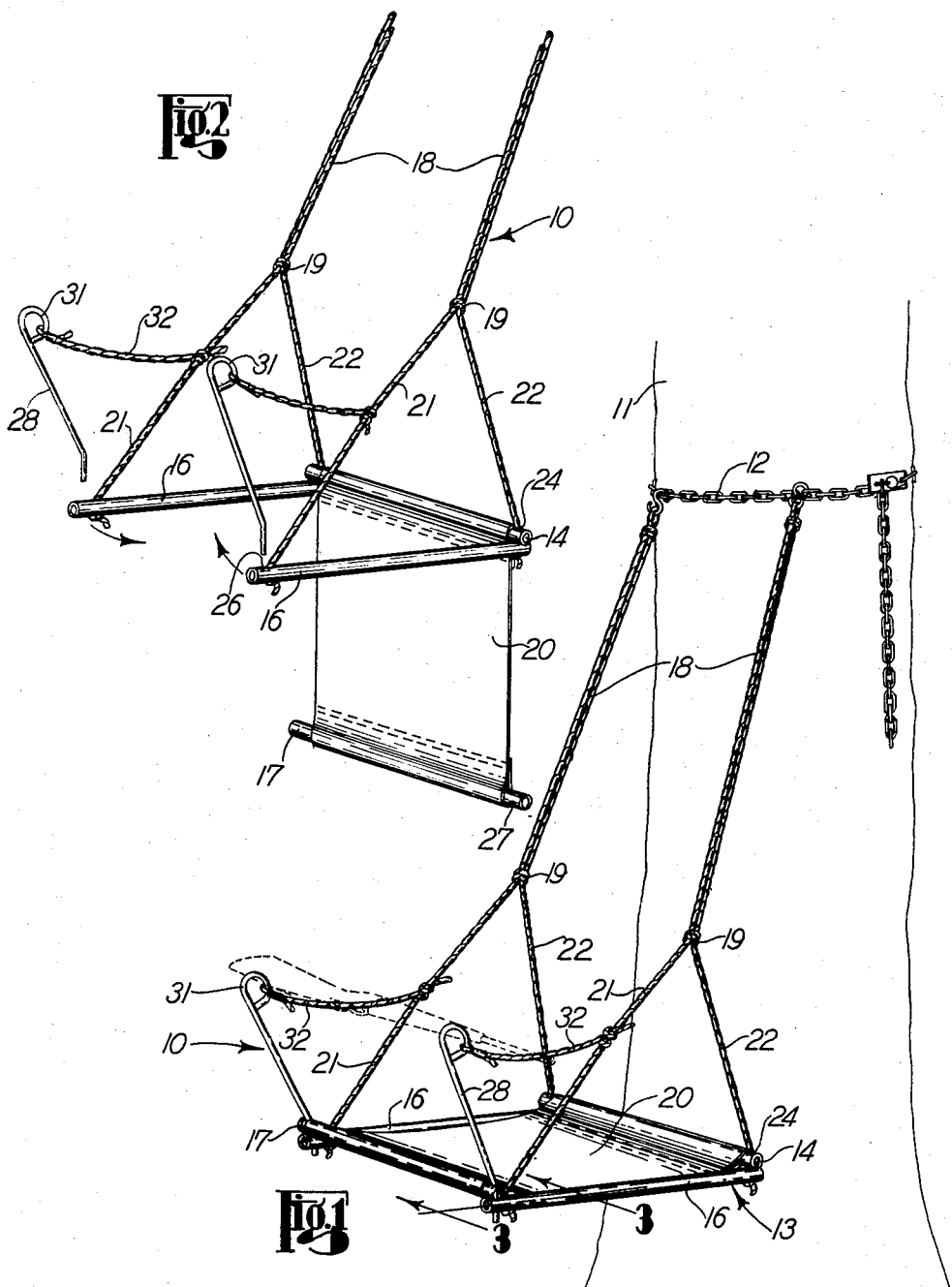
INVENTOR:
RONALD C. WOODWARD
BY: *Arthur J. Hansmann*
ATTORNEY Sept. 9, 1958     R. C. WOODWARD     2,851,085
COLLAPSIBLE SEAT
Filed June 7, 1955     2 Sheets-Sheet 2
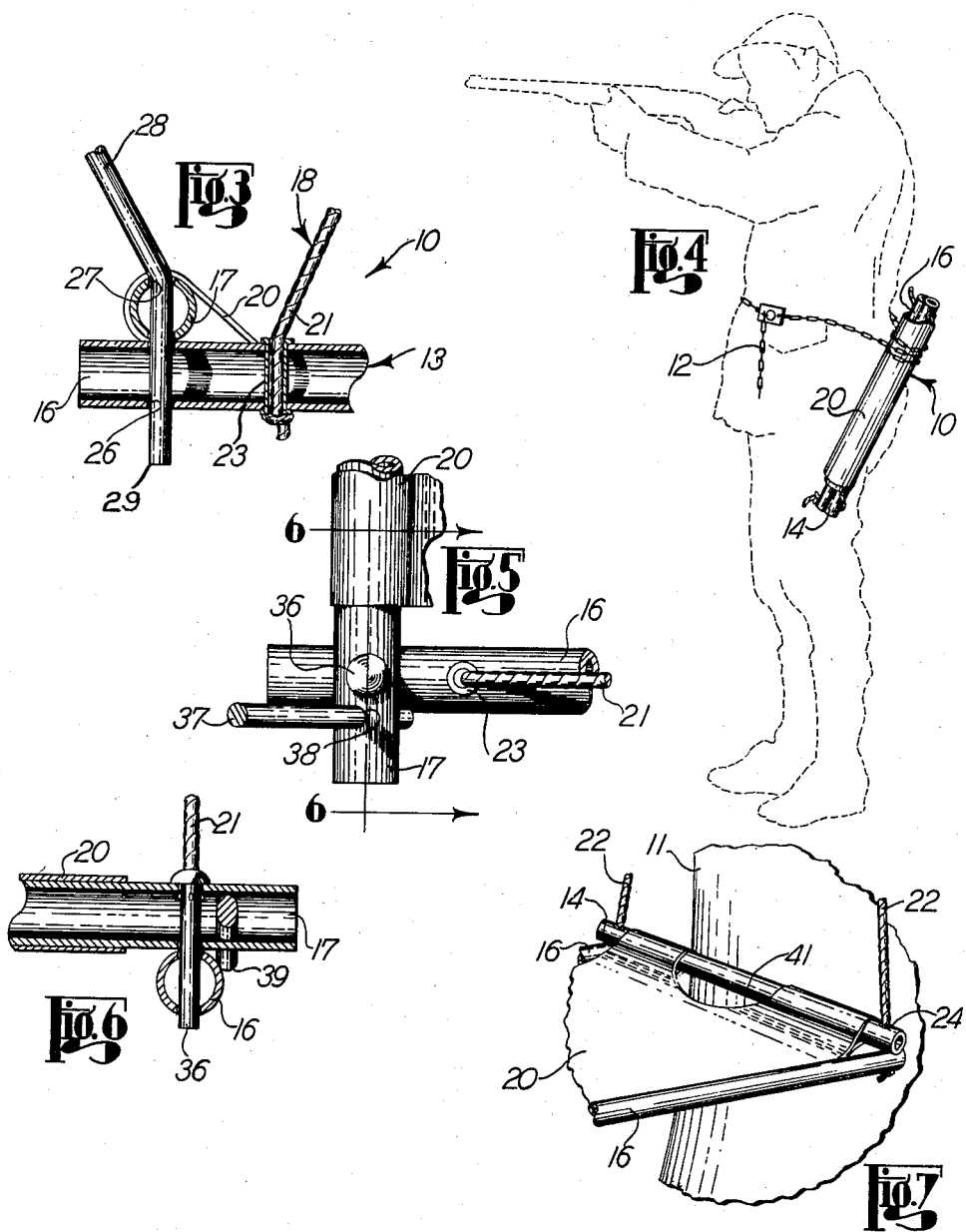
INVENTOR:
RONALD C. WOODWARD
BY: *Arthur J. Hansmann*
ATTORNEY United States Patent Office 2,851,085
Patented Sept. 9, 1958

2,851,085
COLLAPSIBLE SEAT
Ronald C. Woodward, Racine, Wis.
Application June 7, 1955, Serial No. 513,869
3 Claims. (Cl. 155—78)

This invention relates to a collapsible seat, and, more particularly, it relates to a collapsible seat which is suited for use by sportsmen such as hunters, fishermen, and other outdoor sportsmen.

It is an object of this invention to provide a collapsible seat which can be readily and easily attached to a tree or the like for support. In conjunction with this object, it is intended that the tree or the like serve as the back rest of the seat.

Another object of this invention is to provide a seat which is collapsible and can be formed into a compact unit for transporting the seat. The preferred manner of achieving this object is to provide means for carrying the collapsed seat on the body of the person using it.

Still another object of this invention is to provide a collapsible seat which supports a gun in a position convenient for ready use by a hunter occupying the seat.

Other objects and advantages include the provision of a durable, lightweight, and inexpensive collapsible seat. Further, it is an object to provide a collapsible seat suitable for hunters in that the hunter is hidden from the rear, the seat is adjustable and it is suitable for the hunter to assume a shooting position while occupying the seat.

Fig. 1 is a perspective view of one embodiment of a seat of this invention with the seat shown attached to a fragment of a tree.

Fig. 2 is a perspective view of the seat shown in Fig. 1 but with the seat partially disassembled.

Fig. 3 is an enlarged sectional view taken on the line 3—3 of Fig. 1.

Fig. 4 is a reduced view of the seat shown in Fig. 1 collapsed and wrapped and secured around the waist of a hunter shown in dotted lines.

Fig. 5 is an enlarged and fragmentary top view of another embodiment of the seat shown in Fig. 1.

Fig. 6 is a sectional view taken on the line 6—6 of Fig. 5.

Fig. 7 is a fragmentary and perspective view of another embodiment of the seat shown in Fig. 1.

The same reference numerals refer to the same parts throughout the several views.

Figs. 1, 2 and 3 show a seat 10 of this invention attached to a tree 11 or the like by means of a chain or cable 12. The seat includes a foldable seat member having a frame 13 comprised of a rear tubular member 14, a pair of side tubular members 16, and a front tubular member 17. A fabric 20 of a canvas or similar material is suitably attached between the rear member 14 and the front member 17 to be taut therebetween in the seat assembled position. A pair of cables 18 are suitably removably hooked to the chain 12 to depend therefrom in double strands down to the knots at 19 where the cables branch off through the pieces 21 to the front ends of the side members 16 and through the pieces 22 to the rear ends of the side members 16. Thus, the seat frame 13 is suspended from the chain 12 on the trunk of the tree 11 with the latter serving as the back rest of the seat.

Fig. 3 shows one manner of attaching the side cables 18 to the frame 13. The side members 16 are provided with holes at the ends of the members and a tubular sleeve 23 is inserted in each of the holes in the front ends of the members 16 while a tubular sleeve 24 is inserted in each of the holes in the rear ends of the members 16. It will be noted, in conjunction with Fig. 7, that the two sleeves 24 extend through the members 16 and aligned holes in the ends of the rear member 14. As shown, the cables 18 are disposed in the sleeves 23 and 24 and are formed therebelow, such as by knotting, to be secured to the frame 13.

Figs. 1, 2, and 3 further show that the front ends of the side members 16 are provided with holes 26 while the ends of the front members 17 are provided with holes 27. Pairs of the holes 26 and 27 align when the seat is in the assembled position. A pair of upright supports or posts 28 project at their lower ends 29 through the aligned holes 26 and 27 to secure the members 16 and 17 in an assembled position and to mount the posts 28. The posts extend upwardly and forwardly and the upper ends 31 of the posts 28 are shown hooked to engage cables or cords 32 attached between the posts 28 and the cables 18. It should be understood that the posts 28 and the cords 32 serve as a gun rest since a hunter's gun can be laid in a horizontal position across the cords 32 (see dotted gun in Fig. 1) where it is immediately accessible to a hunter occupying the seat in a normal position behind the gun and the gun is in a safe position.

The seat 10 thus permits the hunter to be obscured from the rear since the tree trunk blocks a view of him and game cannot be frightened away when they approach from the rear where the hunter could not see them. Also, it has been found that the side cables 18 provide an excellent shoulder support for the hunter in the seated shooting position as he can lean against the cable on either side from which he shoots while he remains seated. Further advantage resides in the feature of the seat being adjustable in that it can be tilted as the cables 18 are preferably of nylon cord or rope, and therefore resilient to permit the seat to tilt upwardly or downwardly from front to rear, and the rear member 14 is positioned in a selected abutting contact with the tree trunk. Thus, the seat can be tilted at will to a desired comfortable angle because of the stretch and contraction qualities in the cables 18 which are composed of non-stretched (as opposed to pre-stretched) resilient nylon cord. The force in an occupied seat on the rear member 14 at a selected height and in abutting contact with the tree will maintain the tilt desired. With certain movements of the occupant's body, but without arising, the contact height of the rear member 14 to the tree can be changed to vary the tilt to a desired angle.

Thus, the frame 13 is arranged as disclosed to be rigid in the seat assembled Fig. 1 position. Fig. 2 shows the manner of disassembling the seat for collapsing the same. The posts 28 are initially withdrawn from the holes 26 and 27 and that permits the front member 17 to be removed to its position shown in Fig. 2. The side members 16 can then be pivoted inwardly, in the directions of the arrows, about the sleeves 24 to underlie the rear member 14. Next, the cables 18 can be unhooked from the chain 12 and the cables and the posts 28 can be positioned on the fabric 20 and the entire frame can be rolled down the fabric 20 with the latter serving as the wrapping for the collapsed frame. The latter is in the condition shown in Fig. 4 and it can be attached to the body of a person by a chain 12, as shown, and it is thus easily carried.

Figs. 5 and 6 show another embodiment of this invention in the area of the assembly of the front member 17 with the side members 16. A rivet or bolt 36 is secured to the front member 17 in each of the holes 27 to project below the member 17 and into the holes 26 of the members 16. In this manner, the members 16 and 17 are removably secured together as the member 17 and its two bolts 36 can be raised off the members 16. Also, a gun rest support 37 is inserted into a hole 38 in each end of the front member 17 to project above the latter, as shown in Fig. 1, and to project therebelow through an end 39 to abut the side member 16, as shown in Fig. 6, and be supported by the member 16.

Fig. 7 shows an alternate way of forming the fabric 20 by providing a cut-out 41 in the central portion of the rear member 14. The latter, which may be of metal, is then in direct contact with the tree trunk and, therefore, the friction between the seat and the tree is reduced, thereby permitting easier tilting adjustment of the seat agianst the tree and also eliminating any wear of fabric 20 in the latter's otherwise rubbing against the tree.

While specific embodiments of this invention have been shown and described, it should be obvious that certain changes could be made in the embodiments, and the invention should, therefore, be limited only by the scope of the appended claims.

I claim:

1. A hunter's collapsible seat comprising a seat rear member, a pair of seat side members pivotally attached to the ends of said rear member, a seat front member removably attached between the free ends of said side members, said seat rear member and said seat side members and said seat front member arranged for forming a rigid seat frame in the attached positions and for forming a compact bundle in the detached and collapsed position, a fabric attached to said frame for supporting a person thereon, cables attached to said frame for suspending said seat from a support, a pair of gun rest supports attached at the lower ends thereof to said front member and said side members for detachably securing said frame together and extend upright therefrom, a pair of gun rests connected between said gun rest supports and said cables to be horizontally disposed.

2. A collapsible seat comprising a rear frame member, a pair of side frame members pivotally attached at their rear ends to the ends of said rear frame member and having vertically disposed holes at the front ends thereof, a front frame member extended across the top of the front ends of said side frame members and having vertically disposed holes aligned with said holes of said side frame members to form two sets of aligned holes, an upright support inserted at its lower end into each of said sets of aligned holes for removably securing said front frame member to said side frame members, a fabric attached to said front frame member and said rear frame member, cables attached to said side frame members for suspending said seat from a vertical support, a connector attached between each said upright support and said cables.

3. A collapsible seat comprising a foldable seat member, cable elements connected to opposite sides of said seat member for suspending the latter from a vertical support, a pair of rigid support members connected to opposite sides of said seat member to extend upwardly and forwardly from the latter when a person occupies said seat, and additional cable elements connected at opposite ends to said support members and to said first mentioned cable elements to extend generally horizontally when said seat is occupied to form gun rests.

References Cited in the file of this patent

UNITED STATES PATENTS

| | | |
|---|---|---|
| 445,492 | Billeaux | Jan. 27, 1891 |
| 475,310 | Hansen | May 24, 1892 |
| 1,170,229 | Ferguson | Feb. 1, 1916 |
| 1,405,768 | Ekehorn | Feb. 7, 1922 |